United States Patent [19]

Kachnik

[11] Patent Number: 4,654,266

[45] Date of Patent: Mar. 31, 1987

[54] DURABLE, HIGH-STRENGTH PROPPANT AND METHOD FOR FORMING SAME

[76] Inventor: Joseph L. Kachnik, 4737 S. Melita, Fort Worth, Tex. 76133-1307

[21] Appl. No.: 813,574

[22] Filed: Dec. 24, 1985

[51] Int. Cl.[4] .............................................. E21B 43/26
[52] U.S. Cl. ................................... 428/403; 166/280; 427/213; 428/404
[58] Field of Search ................ 428/403, 404; 166/280; 427/213

[56] References Cited

U.S. PATENT DOCUMENTS

| | | | |
|---|---|---|---|
| 3,155,162 | 11/1964 | Flickinger et al. | 166/42 |
| 3,178,303 | 4/1965 | Aagaard | 106/300 |
| 3,202,537 | 8/1965 | Norman et al. | 117/100 |
| 3,264,073 | 8/1966 | Schmidt | 29/182 |
| 3,266,573 | 8/1966 | Rixe | 166/42 |
| 3,343,979 | 9/1967 | Hamrin | 117/100 |
| 3,363,690 | 1/1968 | Fischer | 166/33 |
| 3,399,727 | 9/1968 | Graham et al. | 166/42 |
| 3,594,215 | 7/1971 | Wakefield | 117/100 |
| 3,796,589 | 3/1974 | Ciramella et al. | 117/71 R |
| 4,029,148 | 6/1977 | Emery | 166/254 |
| 4,071,304 | 1/1978 | Chauvin | 427/185 |
| 4,080,927 | 3/1978 | Brown | 118/48 |
| 4,169,911 | 10/1979 | Yoshida et al. | 428/36 |
| 4,265,982 | 5/1981 | McCreary et al. | 428/608 |
| 4,336,338 | 6/1982 | Downs et al. | 501/12 |
| 4,462,466 | 7/1984 | Kachnik | 116/280 |

*Primary Examiner*—Marion C. McCamish
*Attorney, Agent, or Firm*—James C. Fails; William T. Wofford; Arthur F. Zobal

[57] ABSTRACT

What is disclosed is a method of forming a high-strength proppant that resists the deleterious effects of high temperature saline environments characterized by the steps of forming a plurality of particles of propping agent; and coating particles with a thin high-strength covering in a fluidized bed employing chemical vapor deposition to deposit a coating substantially uniformly over all the exposed surfaces of the particles to increase durability of the particles, as well as their strength and resistance to the deleterious effects of hot saline environment. Preferably, each particle has at least one passageway formed directly therethrough for increased permeability once deposited.

13 Claims, No Drawings

DURABLE, HIGH-STRENGTH PROPPANT AND METHOD FOR FORMING SAME

FIELD OF THE INVENTION

This invention relates to proppant for propping fractures around a wellbore penetrating subterranean formations. More particularly, this invention relates to the durable, high-strength proppant, per se, and to the method for forming the same.

DESCRIPTION OF THE PRIOR ART

As is well known, fluids such as crude oil and natural gas are produced from porous and permeable subterranean formations by drilling a wellbore into the subterranean formations so as to allow such production. The porosity or void space of the formation is a measure of its ability to store the oil and gas, and its permeability is a measure of the conductivity of the fluids from the formation. Permeability is frequently improved around the wellbore by fracturing, acidizing and the like.

Hydraulic fracturing is a commonly employed method for increasing the permeability of a formation. It is a method for artificially creating channels of high fluid conductivity from the wellbore out into the formation. These fractures tend to close if they are not propped open. The propping of the fractures is frequently done pumping in particles of fracturing agent called proppant during or immediately following the hydraulic fracturing technique. The high pressure of the hydraulic fluid being injected causes the formation to split along planes of weakness and these fractures are then propped open by the deposition of the particles of the propping agent.

As indicated, the fractures tend to close once the hydraulic pressure stops and various propping agents have been employed to prevent the closing. Typical of propping agents generally include round sand grains, metallic shot, particles coated with bonding materials; for example, walnut hull fragments coated with furfural alcohol or other bonding additives. In the past, it has been conceded that spherical particles of substantially uniform size were the most effective proppants and tended to hold the fractures open better without themselves being embedded into the formation; yet, retain high structural resistance to collapse and permeability to fluid flow.

In accordance with an improvement that I have made and disclosed and claimed in U.S. Pat. No. 4,462,466, there was employed a proppant having at least one passageway formed directly therethrough for increased permeability to flow of fluids.

It is well recognized that proppants frequently tend to weaken; particularly, when they are formed of glass-like material, including glass or zirconia; in hot saline environments, such as hot saline solutions. Moreover, the proppant beads frequently tend to fail in tension, a rather surprising development considering they are designed to resist the compressive force trying to close the fracture.

In U.S. Pat. No. 4,462,466, there was disclosed several U.S. patents and a couple of articles on fracturing. In addition, the examiner cited several references, as shown on the face of that patent; specifically U.S. Pat. Nos. 3,155,162; 3,266,573; 3,363,690; 3,399,727; 4,029,148; and 4,336,338. These patents were all directed to this general area of technology of propping fractures in subterranean formations but did not disclose or make obvious the invention of U.S. Pat. No. 4,462,466. Consequently, they do not anticipate or make obvious the invention in this application. Specifically, they did not provide a proppant or method of forming a proppant that would resist the deleterious effects of hot saline environments, that had high strength that resisted failure when used for propping open a fracture in a subterranean formation about a penetrating wellbore.

SUMMARY OF THE INVENTION

Accordingly, it is an object of this invention to provide a proppant, per se and a method for forming the same that obviates the disadvantages of the prior art and provides a proppant that is durable, that resists the deleterious effects of hot saline solution and that has high-strength for use in propping fractures.

It is a specific object of this invention to provide a proppant and method for forming the same that has a passageway substantially directly therethrough for increased permeability of flow of fluid and that has a coating of thin high-strength covering to achieve exceptional high strength and durability in the environments in which it will be employed.

These and other objects will become apparent from the descriptive matter hereinafter.

In accordance with one embodiment of this invention there is provided a method of forming a high-strength proppant that resist the deleterious effects of hot saline environments and that serves for use in propping a fracture in a subterranean formation surrounding a wellbore characterized by the steps of:

a. forming a plurality of particles of propping agent with each particle being of a size and density to be flowed into the fracture by hydraulic transport having adequate compressive strength to resist closure of the fracture and the respective passageways through the particles once in place; and b. coating the particles with a thin, high-strength covering in a fluidized bed employing chemical vapor deposition to deposit the coating substantially uniformly over all exposed surfaces of the particles so as to increase durability of the particles and increase resistance of the particles to the deleterious effects of hot saline environment, as well as increase the tensile and compressive strength of the particles by pre-stressing the exposed particle surfaces, compared with the particles without the coating.

In a preferred embodiment the metallic covering is tungsten that is deposited by the chemical vapor deposition of tungsten hexahalide, such as hexafluoride, through reduction by hot hydrogen gas. Also disclosed are other embodiments.

In another aspect of this invention, there is provided a high-strength, durable proppant characterized by a plurality of particles of propping agent of a size and density to be flowed into the fracture by hydraulic transport; and having a coating of a thin, high-strength covering so as to increase durability and strength and resistance to the deleterious effects of hot saline solutions.

Preferably the thin high-strength covering, or coating, is a metallic covering; such as, tungsten, molybdenum or rhenium. Also silicon carbide can be employed as the coating material.

DESCRIPTION OF PREFERRED EMBODIMENTS

Typically in fracturing a subterranean formation penetrated by a wellbore, a formation packer is located and set into the well on a tubing to isolate and confine a selected producing zone to be fractured. Fracturing fluid is usually a low-penetrating fluid such as a viscous liquid that can entrain and carry the proppant particles as well as have an increased hydraulic pressure for fracturing the formation without injection of unduly large amounts of fluid in the formation. Frequently, suspensions are employed to form a filter cake on the face of the formation. The pressure and flow is increased until the formation breakdown is achieved and the fracture is propagated out into the formation a desired distance. The proppants, or particles of propping agents, are emplaced in the fracture system to maintain the fractures open after hydraulic pressure is stopped.

The particles of propping agent used herein may be of any shape that had been previously described in the prior art, for example, they may be spherical, ellipsoidal, cubical, cylindrical, prismatic or take a cross-sectional shape of a hexagonal or octagonal shapes, or any other shape. Permeability is provided through the interstices around the particles as the fluid flows from the formation in the case of production. Of course, when injection of fluid is desired, the fluid will be flowed into the formation, as in water injection, miscible flooding, and the like, around particles. It is relatively immaterial in this invention whether the flow is into the formation or from the formation, since the particles of propping agent having the passageways formed therethrough allow increased permeability.

The particles may be made from any of the high-strength materials that have satisfactory compressive strength and density to prop the fracture open and resist the closing forces in the fracture system and on the bore of the particle itself, and still allow the particle to be deposited by hydraulic transport. Typically, the particles will be formed of man-made substances such as silicic material like hard glass, soda-lime-silica particles in the unannealed or untempered state, bauxite, alumina, aluminosilicate, ceramic, porcelain, steatite, and mullite particles. Some of these particles are referred to as zirconia or glass particles. Preferably, the particles have a passageway therethrough for increased permeability as discussed in U.S. Pat. No. 4,462,466. The passageways may be formed by any of the conventional means and will depend in large measure upon the type of particles being employed. For example, if glass particles are employed, the technique such as described in "A HANDBOOK ON BEADS," W. G. N. van Sleen, Chapter III, "The Fabrication and Technique of Glass Beads," Liberty CAP Books, 1973, York, Pa. 17402 (Ref. 746.55). Therein is disclosed a system for elongate tubular structures of glass having penetrating the passageways and thereafter cut into the desired size. On the other hand, the passageways may be formed by drilling a passageway through the material; for example, with lasers, or any other suitable technique. Preferably a mass-production type of technique is employed to insure an economical formation of the particles with the passageways directly therethrough. In a preferred embodiment, the more nearly spherical particles having the passageways formed therethrough are employed because of their high resistance to crushing. However, particles such as cylinders that have adequate walls can also be utilized.

Hence, the shape such as spherical, ellipsoidal, cubical, hexagonal, octagonal, having passageways therethrough are preferred particles of propping agent.

The particle sizes of propping agents that are injected may range from very small sizes to relatively large sizes and as nearly uniform as practical for increased permeability following deposition. For example, particle sizes may range from as small as 0.02 inch maximum dimension to as much as about 0.3 inch or more.

The particles are beads whose maximum dimensions do not vary more than about three-fold from the smallest to the largest in order to obtain good permeability both around and through the particles.

The particles have a density so great as to tend to remain in place and not be readily flowed from the formation and not to float on the injection fluid; yet, have a density not so great as to tend to settle out of the injection fluid too rapidly. A specific gravity in the range of 1.5-5 will suffice. Ordinarily, the density range of the material will be such that its specific gravity will lie in the range of 2-4. In practicing the invention, the particles are usually added to the fracturing fluid in a concentration of about 0.2 pounds per gallon of fluid up to as much as about 8-15 pounds or more per gallon of fluid when a fully packed fracture is desired. Partial layers of proppant may be employed with lower concentrations of the particles in the fracturing fluid.

As indicated hereinbefore, the fracturing fluid will have a critical viscosity, for example, it will ordinarily be at least 100 centipoises and preferably, greater than 300 centipoises; but no more than 10,000 centipoises, to displace the fracture into the formation and to lay down the proppant particles in the fracture system.

One serendipitous benefit of this invention is that the more nearly spherical particles can be employed in the fracturing fluid and can, because of the formed passageway, resist the usual tendency of spherical particles to settle out too rapidly.

With the particles of propping agent of this invention, sustained permeability for protracted intervals has been found to exist in the fracture systems into which these particles having the passageways therethrough and having the film thereon have been injected. Moreover, the injected particles are durable and resist closure of the fractures as effectively as conventional prior art particles. The film in accordance with step b is put on the particles by fluidizing particles in a bed to obtain a substantially uniform coating and thereafter depositing the thin, high-strength covering in the fluidized bed using the technique referred to as chemical vapor deposition (CVD). This term is ordinarily employed to mean a reaction which involves the transport of a vapor of a compound which usually contains a metal to a hot substrate followed by thermal or chemical reduction of an ion (usually a metal ion) in the vapor species at or near the substrate followed by nucleation and deposition of the reduced species onto the substrate.

When the coating materials are suitably adjusted, the deposition temperature and gas flow rates are suitably chosen, the deposition of the coating is uniform on all exposed surfaces. In practice of this step of the invention, the particles are fluidized in a bed by flowing a gas at a velocity sufficient to obtain substantially random motion of the particles throughout the bed.

Generally, when two gases react in a chemical vapor deposition process a suitable deposition rate will be selected in the following manner. The appropriate chemical equation which describes the formation of the desired deposition product is first established, for example, by consulting the literature or the like. Likewise, the lowest reaction temperature that will effect favorable reaction is found. Fluidization of the bed is established by injecting one or more gases at the bottom of the bed and flowing upwardly through the particles in the bed. The lowest reaction temperature, hereafter referred to as predetermined reaction temperature, is achieved by one or more of the heating of the bed, heating of the particles, or heating of the injected gas. The fluidization is ordinarily accomplished by injecting the lighter of the two reactant gases. The molar ratio of reactant gases is found from the chemical equation and then adjusted to provide an excess of one reactant gas, generally the lighter gas. This adjustment can generally be made by increasing by a factor of 10 the flow rate of the reactant gas which does not contain the material to be deposited, while the flow rate of the other reactant gas is held constant. A trial run is then made using the determined flow rates at the reaction temperature, and the quality of the deposited material is noted. If no nodules have formed, the reaction rates are suitable. If nodules have formed, the molar ratio is further adjusted by reducing by a factor of 2 the flow rate of the gas containing the material to be deposited. It is believed that when two such trial runs are made in the above-described manner, one will establish a suitable, although not necessarily an optimum, set of conditions for achieving uniform deposition of the film material with a 2-gas CVD reaction in a fluidized bed.

Table 1 hereinafter can be used conveniently to select conditions suitable for forming a substantially uniform coating on the particles of proppant in a fluidized bed using the particular reactant plating gases shown in the table. The process such as shown and described in U.S. Pat. No. 4,265,982 can be employed in accordance with step b of this invention and the details of that patent are incorporated herein by reference for details that are omitted herefrom. Specifically, a chemical reaction that is satisfactory is as follows in reaction.

$$WF_6 + 3H_2 \xrightarrow{723° K.} W + 6HF \quad (I)$$

TABLE I
CONDITIONS FOR SUBSTANTIALLY UNIFORM COATING OF PROPPANT

| Metal-Containing Gas or Other Plating Gas | Preferred Embodiment $WF_6$ | $ReF_6$ | $MoF_6$ | Nickel Carbonyl |
|---|---|---|---|---|
| Coating Temperature | | | | |
| Minimum | 150° C. | 200° C. | 150° C. | 80° C. |
| Suitable Range | 150–600° C. | 200–300° C. | 150–600° C. | 80–250° C. |
| Preferred | 400–425° C. | 290–325° C. | 400–425° C. | 100–200° C. |
| Pressure in Reaction Chamber | | | | |
| Maximum | Ambient | 100 torr | Ambient | 300 torr |
| Suitable range | 10–150 torr | 10–70 torr | 10–150 torr | 10–250 torr |
| Preferred | 10–60 torr | 10–70 torr | 10–60 torr | 100 torr |
| Ratio of Rates of Flow of $H_2$:Metal-Containing Gas | | | | |
| Suitable range | 10:1 to 50:1 | 10:1 to 30:1 | 10:1 to 30:1 | 30:1 (carrier to reactant) |
| Preferred range | 15:1 to 20:1 | 25:1 to 30:1 | 15:1 to 20:1 | 30:1 (carrier to reactant) |

In general, a coating chamber, or fluidized bed, is located downstream from a source of the particular reactant such as tungsten hexafluoride gas, a source of hydrogen gas and a source of diluent or inert gas like helium, argon, or the like. Suitable metering valves, control valves and the like are employed to achieve the desired mass flow rates of the respective gases.

If desired, a hydrogen flush can be employed for preheating the bed and particles that are fluidized therewithin. Of course, suitable scrubbers and the like are employed to obtain the requisite purity of gases. In the process the fluidized bed should have the reactant gas inlets coming in below it so as to fluidize the particles therewithin. If desired, batch reactant process can be carried out. On the other hand, under fluidized conditions the particles can flow much as a fluid flows, as has been long recognized.

The heating means used to control the temperature can be any of the suitable heating means such as an RF coil around the bed or by heating one or more of the injected gases by suitable heat exchange, or both. The proppant particles may be used first, per se, to form the bed.

The thickness of the coating deposited can be varied by choosing dwell time within the reaction vessel as well as any of the usual kinetic variables.

Preferably, a decomposition reaction or a chemical reduction reaction is employed with good results with respect to the hexafluorides; including, for example, molybdenum hexafluoride and rhenium hexafluoride, and other metallic halides to deposit other metals.

In the process of step b of the method of this invention the first gas is introduced to the reactor so that it fluidizes the particles of proppant. This fluidizing resembles boiling liquid and achieves substantially uniform and random motion of the particles. A rate suitable for fluidizing the bed is determined empirically by adjusting the flow rate until the action of the bed resembles a boiling liquid. This first gas which is used to fluidize the bed can be either inert gas or a mixture of inert gas and one of the reactant gases such as hydrogen. If the reactant gas is used to fluidize the bed it should be readily available and inexpensive since a large volume of gas will be used to fluidize the bed. Such a gas can be recycled if desired. When the tungsten is to be deposited, hydrogen gas can be used both as a reactant and as a fluidizing gas, either alone or with an inert gas such as helium or argon. The flow rate of the gases used to fluidize the bed can be selected to fluidize the bed to desired extent to maintain the bed fluidized and if the fluidizing gas is a reactant to react to deposit the metal at a suitable deposition rate which is selected as described hereinbefore. Therefore, the flow rate will be varied depending upon the density of the fluidized bed, the volume of the bed, and the volume of the reactor bed, or fluidized bed.

After the fluidized bed is established by introduction of the first gas or gas mixture, a gas or vapor compound or compounds containing the metal to be deposited is next introduced into the fluidized bed chamber, mixed with the reactant gas to produce the metal coating. Provided that all of the reactants necessary to produce the metal to be plated are then present in the coating chamber and provided that the temperature of the reaction chamber is sufficiently high, the metal-forming reaction then takes place within the fluidized bed so that the metal film is deposited on to the proppant as the desired coating material on the surfaces including surfaces of passageways of the particles of proppant.

In a metal-forming reaction the chosen deposition temperature and flow rate of the metal-containing gas or vapor will determine the coating rate of the particles.

As the temperature of the coating chamber is increased, the rate of deposition of metal increases. At excessively high deposition rates, stresses in the deposited metal can occur and nodules can form. Hence, to achieve a uniform deposition of metal on the proppant particles, deposition temperatures should not be excessively high.

The deposition temperature useful in a metal-forming CVD reaction is any temperature which satisfies the following two conditions. The metal temperatures must be at least high enough for the metal-forming reaction to take place on the surfaces of the particles and the temperature must be low enough so that the metal-forming reaction proceeds at sufficiently low rate as not to encounter the above delineated disadvantages.

The heating of the chamber should be kept substantially uniform throughout the coating reaction so as to aid in achieving the uniform coating of the particles of proppant.

When the reaction which deposits the metal is: $3H_2 + WF_6 \rightarrow 6HF + W$, the volume ratio of hydrogen to tungsten hexafluoride gas which gives a satisfactory deposition of tungsten is in a ratio of from about 10:1 to about 50:1 and the ratio preferably lies within the range from about 15:1 to about 20:1.

Generally, a vacuum pump will be used to withdraw waste gases from the reaction chamber.

Generally, the pressure in the coating chamber is not critical to achieving uniform deposition of coating material; however, the pressure in the chamber will often lie in the range from about 50 torr to about 760 torr (standard atmospheric pressure). More often, the pressure will be chosen to lie in the range from about 10 to about 150 torr. However, the preferred range is from about 10 to about 60 torr.

As the coating reaction proceeds in a batch reactor, the fluidized bed gets denser, hence, it may be desirable to increase the flow of fluidizing gas at various time intervals during the coating reaction.

The metal depositing reaction of tungsten hexafluoride with hydrogen gas occurs over a wide temperature range; for example, from about 150° C. to about 1000° C., and any temperature within this range is expected to provide a satisfactory plating of tungsten. Generally, the coating temperature for this reaction will be within the range of from about 150° to about 600° C. However, the temperature range from about 400° to 425° C. is the preferred temperature range because temperatures within this range provide a good reaction rate, do not require large amount of cooling, and form uniform metal deposits. After the desired amount of coating material has been deposited onto the surfaces of the particles, the chemical reaction chamber can be cooled and its contents removed if it is a batch process. On the other hand, if the flow process is employed, the reaction can continue to be carried out while the particles are flowed into the chamber and flowed from the chamber in accordance with technology that is conventional with respect to catalysts in petroleum refining and similar fields. Heat exchange between inlet and effluent streams improve the economics frequently.

The uniformity of the coating obtained in the chemical vapor deposition clearly will function to give a maximum strength to the particles of material.

It is not fully understood but is theorized that the benefits of this process; namely, the high-strength films on the particles and the peening of the surfaces between the turbulent particles during deposition are analogous to prestressing of concrete by imposing an external stress onto the concrete which increases its tensile strength. The coating also forms a shell such that should the inner particle fracture, the pieces are retained within the shell and will not migrate to reduce permeability or plug the fracture. The coating also reduces resistance to fluid flow around or through the particles. This invention increases the proppant resistance to hot saline environments and forms surprisingly durable particles regardless of whether or not the theory is correct.

From the foregoing, it can be seen that this invention achieves the objects delineated hereinbefore. In particularly forms proppant that is durable, has high strength and resists the deleterious effects of hot saline environments through a not fully understood process following the deposition of a metallic film on the exposed surfaces of the particles of the proppant having the passageways substantially directly therethrough.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. A method of forming a high-strength proppant that resists the deleterious effects of hot saline solution and that serves in propping a fracture in a subterranean formation surrounding a wellbore, comprising the steps of:

a. forming a plurality of particles of propping agent, said particles being of a size and density to be flowed into the fracture by hydraulic transport, having adequate compressive strength to resist closure of the fracture; and b. coating said particles with a thin, high-strength covering in a fluidized bed employing chemical vapor deposition to deposit said coating substantially uniformly over said particle so as to increase durability of said particle and to increase resistance of said particle to the deleterious effects of hot saline environment.

2. The method of claim 1 wherein said coating comprises metallic tungsten.

3. The method of claim 2 wherein said metallic tungsten is deposited substantially uniformly over the entire exposed surfaces of said particles by reducing tungsten hexahalide in accordance with the reaction:

$$WX_6 + 3H_2 \xrightarrow{723^\circ \text{K.}} W + 6HX, \qquad (I)$$

where X is a halide selected from the class consisting of fluorine, chlorine and bromine.

4. The method of claims 3 wherein $WX_6$ is $WF_6$.

5. The method of claim 1 wherein step b is carried out by:

a. heating the chamber and the fluidized bed of said particles to a predetermined reaction temperature;

b. introducing a first reactant, gas into said fluidized bed; said first reactant gas being chosen such that it reacts to deposit said coating material onto said particles at said predetermined reaction temperature;

c. allowing said first reactant gas to react at said predetermined reaction temperature to deposit said covering.

6. The method of claim 5 wherein said first reactant gas is selected from a class consisting of metal halides and a carbonyl compound selected from a class consisting of nickel carbonyl, molybdenum carbonyl and iron carbonyl.

7. The method of claim 6 wherein said first reactant gas comprises at least one metal hexafluoride selected from a group consisting of tungsten hexafluoride, rhenium hexafluoride, molybdenum hexafluoride, and mixtures thereof; and a second gas is employed and is selected from the group consisting of hydrogen and a mixture of hydrogen and at least one inert gas and is introduced at said predetermined reaction temperature into said chamber and said fluidized bed to reduce said first reactant gas and deposit the metal in accordance with the metallic ion employed.

8. The method of claim 7 wherein said second gas comprises hydrogen, wherein said first reactant gas comprises tungsten hexafluoride and wherein said predetermined reaction temperatures in the range of from about 150° C. to about 1,000° C.

9. In the method according to claim 8 wherein said predetermined reaction temperatures in the range of about 150° C. to about 600° C.

10. The method of claim 9 wherein the ratio of the flow rate of hydrogen to tungsten hexafluoride is in the range of 10 to 1 to about 50 to 1.

11. A proppant that resists the deleterious effects of a hot saline environment and that serves for use in propping a fracture in a subterranean formation surrounding a wellbore comprising a plurality of particles of propping agent, each particle being of a size and density to be flowed into the fracture by hydraulic transport and having adequate compressive strength to resist closure of the fracture and of the respective said passageways through the particles; said particles of propping agent including a thin, high-strength covering so as to increase durability of the particles, increased strength of the particles compared to the particles without the covering and to increase the resistance of the particles to the deleterious effects of hot saline environment.

12. The proppant of claim 11 wherein the thin high-strength coating comprises metallic tungsten.

13. The proppant of claim 11 wherein each said particle has at least one passageway formed directly therethrough for increased permeability to flow of fluids from the subterranean formation once flow of fluids is restored following fracturing and deposition of the proppant and the interior of said passageway is also substantially uniformly coated.

* * * * *